United States Patent Office 2,827,432
Patented Mar. 18, 1958

2,827,432

IMPARTING WATER RESISTANCE TO LEATHER

Alfred W. Hopton, Lewiston, N. Y.

No Drawing. Application July 8, 1954
Serial No. 442,204

18 Claims. (Cl. 252—8.57)

This invention concerns a process for imparting water resistance to leather, and the water resistant leather obtained by such process. More particularly, my process relates to the treatment of leather with a stuffing composition containing a high molecular weight hydrocarbon group of at least about 27 carbon atoms, in addition to other leather stuffing materials, whereby the leather is rendered water penetration resistant for a prolonged period under conditions of repeated flexing and unflexing such as undergone by shoe upper leather during walking. Leather treated in accordance with my invention is still capable of "breathing"; i. e. is liquid-impermeable, but air-permeable.

While numerous processes for leather stuffing are known in the art, such processes, which essentially include the treatment of leather with oils and/or fats after tanning, confer but limited water-resistance to leather, and particularly become ineffective after a number of flexes imparted to the leather, e. g., during walking in a shoe made from such leather. After a substantial number of flexes, leather thus treated is often no more water resistant than unstuffed leather, because of a kind of pumping action in the leather pores which are partially filled by the stuffing composition. To "rubberize" the leather increases its water resistance, but plugs the pores of the leather and prevents the passage of air and water vapor therethrough, which renders a shoe made from such "rubberized" leather incapable of "breathing" and makes it very uncomfortable to wear. While a number of resin treatments for leather has been disclosed in the art in recent years, most of these treatments still suffer from one or more of the disadvantages just outlined.

After numerous experiments and tests, I have found that leather treating compositions can be provided which afford dynamic water resistance to leather (i. e. water resistance which is still effective after prolonged flexing and unflexing) when a water-insoluble high molecular weight organic substance having a large preponderance of hydrophobic groups is incorporated in the leather stuffing composition, which organic substance is sterol or a hydrocarbon sulfonate having at least about 27 carbon atoms in the molecule. Sterols are solid monohydric alcohols, usually of animal or vegetable origin. High molecular weight hydrocarbon sulfonates are characterized by the general formula $$R(-\overset{O}{\underset{O}{\overset{\|}{S}}}-O-M)_n$$

wherein R is a hydrocarbon radical having at least about 27 carbon atoms, M is a monovalent metal (e. g. sodium or potassium) or amino radical (such as —NH$_2$, mono- or dialkyl amine, e. g., ethyl or diethyl amine, and ammonium including substituted ammonium such as di- or tetramethyl ammonium), and $n$ is at least 1; the number of sulfonate

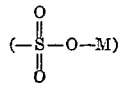

groups is ordinarily 1, but may be 2 or even more than 2, provided that there is not more than one sulfonate group to about 27 carbon atoms in the molecule of the sulfonate. The high molecular weight hydrocarbon sulfonate may be derived from a by-product of petroleum refining (petroleum sulfonate), or using a product of synthesis.

Without at this time limiting myself to any specific theory for explaining the effectiveness of my leather treatment, I presently attribute the effectiveness of my compositions to the formation of a protective barrier within the leather, by reason of the presence of a large preponderance of hydrophobic groups (hydrocarbons) in the activating substance (sterol or hydrocarbon sulfonate) in proportion to the hydrophilic groups (hydroxyl or sulfonate); i. e. only one hydroxyl group in the sterol, and not more than one sulfonate group per every 27 carbon atoms in the molecule of the sulfonate. Assuming this postulate to be correct, the mechanism of water repellence would be substantially as follows: A drop of water penetrating into the leather will attract the hydrophilic groups in the molecules of the activating substance, which turns the hydrophobic groups outwardly, thereby sealing off the drop of water and repelling further water drops which seek to penetrate the leather. In other words, when water contacts the surface of the leather treated with the dynamic waterproofing materials of the present invention, a repellent barrier containing some water is formed immediately near the surface of the leather. The activators (sterols, or higher molecular weight sulfonates) and synergists, such as higher fatty acids, have good adherence to the leather fibers generally, and this is particularly noticeable in the case of chrome-tanned leather as will be more fully explained hereinafter. It will be understood, however, that I do not wish to be committed to any particular theory or explanation of the effectiveness of its mechanism.

Among the sterols useful in the practice of my invention are sterols derived from wool fat, such as cholesterol (C$_{27}$H$_{45}$OH), dihydrocholesterol (C$_{27}$H$_{47}$OH) and isocholesterol (an unsaturated sterol closely related to cholesterol, and whose empirical formula is given in the literature as either C$_{27}$H$_{45}$OH or C$_{30}$H$_{49}$OH), or of vegetable origin, such as sitosterol (a sterol derived from corn oil or soybean oil and having an impirical formula of C$_{27}$H$_{45}$OH, which makes it an isomer of cholesterol). Other sterols having at least about 27 carbon atoms per molecule are likewise suitable in the practice of my invention, as they are water-insoluble, but oil-soluble.

The cholesterol or other sterols need not be chemically pure to be useful in my invention; thus, wool fat, which is a high molecular weight ester yields on de-esterification, e. g., by means of alkaline hydrolysis of the fat, a mixture of higher fatty acids and higher monohydric alcohols (sterols, such as cholesterol isocholesterol) and other higher alcohols, which mixture of free but physically unseparated alcohols and acids is suitable for incorporation in a leather treating composition in accordance with the present invention, without physically separating the acids and alcohols.

The other subgroups of activating substances for use in leather treating compositions according to my invention are high molecular weight petroleum sulfonates, e. g. of the type obatined as by-products in petroleum refining, or synthetic analogs of petroleum sulfonates. They have the general formula $$R(-\overset{O}{\underset{O}{\overset{\|}{S}}}-O-M)_n$$

wherein R is a hydrocarbon radical having at least about 27 carbon atoms, M is a monovalent metal (e. g. sodium or potassium), or ammonium, and $n$ is 1 or more. Hydrocarbon sulfonates of a molecular weight of at least 500 are preferred; a typical example being

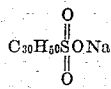

(M. W. 513). They are water-insoluble, but oil-soluble. The hydrocarbon radical R can be aliphatic, alicyclic, aryl, aralkyl or alkaryl

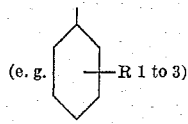

the ratio of carbon atoms to hydrogen atoms is usually about $C_nH_{2n-10}$, but this ratio is capable of being varied, e. g., it may be $C_nH_{2n-6}$ or $C_nH_{2n-13}$. I have found that petroleum sulfonates having less than 27 carbon atoms in the molecule are unsuitable for the purpose of my invention, either because they are water-soluble, or because the radical weight of the hydrophilic

group is too large in proportion to the radical weight of the hydrophobic hydrocarbon group, or for a combination of these reasons. Thus, a sulfonate of the empirical formula $C_{26}H_{42}SO_3Na$ (M. W. 457) was found unsuitable. On the other hand, a petroleum sulfonate having a molecular weight slightly above 470, corresponding to the empirical formula $C_{27}H_{44}SO_3Na$ (M. W. 471), gave good results in a leather stuffing composition. Still higher molecular weight sulfonates, e. g. M. W. 600, 700, and higher were found suitable, an example of the latter being $C_{37}H_{62}SO_3Na$ (M. W. 707). While ordinarily I prefer mono-sulfonates, poly-sulfonates wherein the ratio of the number of sulfonate groups to the number of carbon atoms in the hydrocarbon radical is not more than about 1:27 may be used.

I wish to emphasize at this point that the hydrocarbon sulfonates contemplated for use in the present invention are true sulfonates of the type formula $RSO_3M$, wherein the high molecular weight hydrocarbon radical is directly attached to the sulfur atom of the sulfonate group, as distinguished from the organic sulfates of the type formula $ROSO_3Na$ (empirical: $RSO_4Na$), wherein one oxygen atom is interposed between the hydrocarbon radical and the sulfur atom.

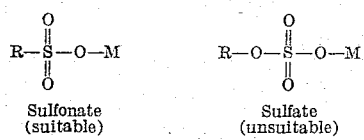

The petroleum sulfonates adapted for use in my invention need not be chemically pure homogeneous compounds. Small admixtures of low molecular weight petroleum sulfonates do not defeat the utility of the sulfonate composition, provided that the average molecular weight of the petroleum sulfonate composition is within the disclosed range, i. e. above about 470 (corresponding to an average of at least about 27 carbon atoms in the molecule) and preferably above 500. It should be understood, however, that such mixtures of petroleum sulfonates should not be too heterogeneous; i. e., a 50:50 mixture of very low molecular weight (say, M. W. 300) and fairly high molecular weight (say, M. W. 700) petroleum sulfonates would not be very suitable (even though the average molecular weight of such a mixture would be above 470), inasmuch as the water-soluble low molecular petroleum sulfonate would tend to act as a wetting agent.

As heretofore pointed out, I do not recommend to treat the leather with sterol or petroleum sulfonate by themselves, but rather to add the sterol or petroleum sulfonate to a leather impregnating composition of conventional leather stuffing ingredients well known to the art. While not limiting myself to any particular composition, I prefer those which contain a substantial proportion, about 8% or more of higher fatty acid (such as oleic acid, palmitic acid, lauric acid, and the like), particularly when the activator is a high molecular weight hydrocarbon sulfonate. When the esterified wool fat (which, as heretofore mentioned, is a physically unseparated mixture of chemically free higher fatty acids and higher monohydric alcohols and other higher alcohols) is employed as the additive, the fatty acid component of the stuffing composition may consist partly or wholly of the higher fatty acid wool fat derivative. The proportion of "activating agent" (by which term I refer to the sterol or high molecular weight sulfonate, which is added to the leather stuffing composition) should be at least about 4% by weight of the composition in order to confer lasting water resistance upon the leather in actual use, and preferably should be higher, e. g. in the order of about 7% or more, e. g. about 15%. Ordinarily, there is no cumulative advantage in increasing the proportion of "activator" above 25%, although operative leather stuffing compositions can be compounded containing as much as about 50% sterol or 75% high molecular weight petroleum sulfonate.

The following specific examples of leather stuffing compositions illustrate the wide variety of applications in which my invention may be practiced; however, they are not intended to limit the scope of my invention to any specific ingredients or proportions shown.

LEATHER TREATING COMPOSITIONS ACTIVATED BY A STEROL

*Example 1*

| | Percent |
|---|---|
| Cholesterol | 15 |
| Oleic acid | 15 |
| Tallow fatty acids | 15 |
| Petrolatum | 55 |
| | 100 |

This composition contains 15% "activator" cholesterol, 30% higher fatty acids, and 55% ordinary stuffing material (petrolatum).

*Example 2*

| | Percent |
|---|---|
| Pure wool fat alcohols (about one half of which are high M. W. sterols) | 30 |
| Polymerized fatty acids | 25 |
| Petrolatum | 20 |
| Lanolin (as ester) | 25 |
| | 100 |

The "wool fat alcohol" are wool fat derivatives obtained by de-esterifying the wool fat, and contain about one-half water-insoluble sterols and one-half straight chain alcohols. Thus, this composition contains about 15% "activator" (sterols), 25% higher fatty acid, and 60% ordinary stuffing material (petrolatum, lanolin, plus straight chain wool fat alcohols).

*Example 3*

| | Percent |
|---|---|
| Pure wool fat alcohols | 50 |
| Oleic acid | 25 |
| Petrolatum | 25 |
| | 100 |

This composition contains 25% activator (one-half of the pure wool fat alcohols being sterols), 25% higher fatty acid, and 50% ordinary stuffing material (petrolatum, plus straight chain alcohol components of the wool fat alcohols).

*Example 4*

| | Percent |
|---|---|
| Pure wool fat alcohols | 30 |
| Petrolatum | 40 |
| Mineral oil (hydrocarbon) | 30 |
| | 100 |

This composition contains 15% activator (sterols, which are one-half of the pure wool fat alcohols) and 85% of ordinary stuffing material (petrolatum, mineral oil, straight chain alcohol derivatives of wool fat).

*Example 5*

| | Percent |
|---|---|
| Unseparated mixture of de-esterified purified degras (sheep wool grease containing about one-half higher fatty acids, about one-quarter sterols and about one-quarter straight chain alcohols) | 75 |
| Mineral oil | 15 |
| Oleic acid | 10 |
| | 100 |

This composition contains about 18% activator (sterols contained in the de-esterified degras, 48% higher fatty acids (oleic acid, plus higher fatty acid content of the de-esterified degras), and 35% of ordinary stuffing material (mineral oil plus straight chain alcohols contained in the de-esterified degras).

Leather samples impregnated with the compositions of Examples 1 to 5 were tested for dynamic water penetration on an accelerated test machine which subjects the leather to constant flexing and unflexing. None of the samples showed water penetration for 120 minutes, at which time the tests were discontinued. Therefore, in view of the substantially equally good performance of all five compositions, I prefer that of Example 5 for the reason that it is the least expensive of the five, while conversely the composition of Example 1 is the most expensive. The common denominator of all five examples is the presence of adequate amounts of chemically uncombined high molecular weight sterols.

LEATHER TREATING COMPOSITIONS ACTIVATED BY A WATER-INSOLUBLE HIGH MOLECULAR WEIGHT PETROLEUM SULFONATE

*Example 6*

A preferred leather treating composition containing a water-insoluble high molecular weight petroleum sulfonate in the presence of higher fatty acids is:

| | Percent |
|---|---|
| Red oil (oleic acid) | 13 |
| Tallow fatty acids | 13 |
| Alkyl phenol (alkyl chain $C_{14}$) | 10 |
| Wool grease fatty acids | 7 |
| Polymerized fatty acids (from linoleic acid) | 20 |
| $C_{30}H_{50}SO_3Na$ (approx.) | 8 |
| Petrolatum | 14 |
| Microcrystalline wax (soft) | 6 |
| Mineral oil | 9 |
| | 100 |

This composition contains 8% "activator" (petrolatum sulfonate having 30 carbon atoms in the hydrocarbon radical; M. W. 513), 53% higher fatty acids, 10% long chain alkyl phenols, and 29% conventional stuffing material (petrolatum, microcrystalline wax, mineral oil). Chrome-tanned leather impregnated with about 20 parts by weight of this composition (per 100 parts of stuffed leather) gave superior results for dynamic water resistance. In the case of very porous leather, such as sheepskin leather, up to about 30 parts by weight of the same composition may be put into the leather without materially impairing its wearing comfort. Other fatty acids than those specifically named in this example may be substituted, provided they are not so excessively hard as to prevent the formation of a continuous barrier within the leather. The molecule of the fatty acid should contain at least about 10 carbon atoms and preferably 16 to 20; natural as well as synthetic and/or polymerized fatty acids are suitable, but they should not be hydrogenated to a point where they become too hard for practical use in leather stuffing.

The long chain alkyl phenol constituents which contain 14 or more carbon atoms in the side chain (thus amounting to 20 or more carbon atoms in the molecule) are functional equivalents of the other higher fatty acids and are chemically classified as organic acids. Thus, the term "higher fatty acids" as used in the specification and claims are intended to include long chain alkylated phenols and analogous partly cyclic or aromatic acidic compounds.

The ratio of higher molecular weight sulfonate to fatty acid may vary over a wide range, say from 8:1 to 1:12 in order to obtain synergistic results, i. e., dynamic waterproofing performance which could not be obtained by only one of them in equivalent amounts. Without wishing to commit myself to any specific theory, I presently ascribe this synergistic action to a coaction in the leather between the hydrophobic high molecular weight hydrocarbon group of the petroleum sulfonate and the hydrophobic hydrocarbon group of the fatty acid. A particular affinity appears to exist between the sulfonate group of the petroleum sulfonate and the chrome salt in chrome-tanned leather.

The functional equivalency between higher fatty acids and higher fatty alcohols in leather treating compositions according to my invention is discussed at the foot of this specification.

*Example 7*

A leather treating composition containing high molecular weight petroleum sulfonate and a very large proportion of fatty acids is:

| | Percent |
|---|---|
| High molecular weight petroleum sulfonate ($C_{30}H_{50}SO_3Na$) | 7.6 |
| Mineral oil or wax | 2.4 |
| Red oil (oleic acid) | 45 |
| Polymerized linoleic acid | 45 |
| | 100 |

Chrome leather impregnated with this composition showed 90 minutes' water resistance under dynamic test conditions, when subjected to tests outlined at the foot of Example 5.

*Example 8*

A leather treating composition having a high proportion of high molecular weight petroleum sulfonate as compared with fatty acids is:

| | Percent |
|---|---|
| $C_{30}H_{50}SO_3Na$ high M. W. petroleum sulfonate | 75 |
| Red oil (oleic acid) | 10 |
| Mineral oil | 15 |
| | 100 |

Chrome leather thus impregnated showed 80 minutes' dynamic water resistance under the same test.

Example 9

A composition showing remarkable results on chrome leather as well as vegetable tanned leather is as follows:

| | Percent |
|---|---|
| High molecular weight petroleum sulfonate ($C_{30}H_{50}SO_3Na$) | 13.3 |
| Mixture of fatty acids | 5.5 |
| Mineral oil | 14.7 |
| Petrolatum | 11.9 |
| Microcystalline wax | 5.1 |
| | 100 |

A sample of chrome tanned leather and a sample of vegetable tanned leather were treated with this composition, and showed over 30 minutes' dynamic water resistance.

Example 10

A leather stuffing composition containing approximately equal proportions of high molecular weight sulfonate activator and higher fatty acid is:

| | Percent |
|---|---|
| $C_{30}H_{50}SO_3Na$ high M. W. petroleum sulfonate | 9.5 |
| Red oil (oleic acid) | 10 |
| Mineral oil | 10.5 |
| Petrolatum | 70 |
| | 100 |

Chrome tanned leather impregnated with this composition showed dynamic water resistance of over 130 minutes, however, the same composition had not quite as favorable a result in vegetable tanned leather, to which it imparted 45 minutes' dynamic water resistance.

Example 11

The following leather stuffing composition:

| | Percent |
|---|---|
| High molecular weight petroleum sulfonate ($C_{30}H_{50}SO_3Na$) | 19 |
| Red oil (oleic acid) | 60 |
| Mineral oil | 21 |
| | 100 | was applied to re-tanned leather, and gave it a dynamic water resistance of over 120 minutes. In this composition the ratio of sulfonate to fatty acid is about 1:3, and the ratio of fatty acid to the inactive stuffing agent (mineral oil) is about 3:1.

In a control experiment, re-tanned leather was treated with a composition containing 76% fatty acids and 24% petrolatum. This leather had a dynamic water resistance of only 2 minutes. In a further control experiment, leather treated with petrolatum alone showed a dynamic water resistance of 1½ minutes. In a third control experiment, leather treated with a commercial tannery stuffing mixture has a dynamic water resistance of 2 minutes; and in a fourth control experiment, leather treated with petroleum sulfonates alone (containing over 83% high molecular weight petroleum sulfonates having an average molecular weight of about 500), dynamic water resistance of the leather was only 1¼ minutes.

These last four control experiments clearly demonstrate the severity of the dynamic water penetration test and the unexpected manifold superiority of compositions containing high molecular weight sulfonates in accordance with the present invention.

It will be understood that the high molecular weight petroleum sulfonate and mineral oil components of Examples 6–11 may be added to the leather treating composition as an unseparated mixture.

The following two examples illustrate two additional compositions containing 25% of a petroleum sulfonate product whose components equal 11.9% high molecular weight sulfonate (27C or more) and 13.1% mineral oil:

Example 12

| | Percent |
|---|---|
| Petroleum sulfonate product | 25 |
| Soft microcrystalline wax | 20 |
| Polymerized linoleic acid | 25 |
| Petrolatum | 15 |
| Wool grease (ester) | 15 |
| | 100 |

Example 13

| | Percent |
|---|---|
| Petroleum sulfonate product | 25 |
| Petrolatum | 30 |
| Palmitic acid | 20 |
| Polymerized linoleic acid | 15 |
| Mineral oil | 10 |
| | 100 |

Leather impregnated with the compositions of Examples 12 and 13 to the extent of about 20–24%, based on the weight of the stuffed leather, gave test results substantially equivalent to Example 6.

LEATHER TREATMENT WITH COMPOSITIONS CONTAINING SYNTHETIC SULFONATES

In addition to high molecular petroleum sulfonates obtained as by-products from petroleum refining, there are various processes for synthesizing high molecular weight petroleum sulfonates of controlled molecular weight and controlled degree of sulfonation. The following examples illustrate typical methods of synthesizing such high molecular weight sulfonates, and also give typical leather treating compositions which contain these sulfonates as active ingredients.

Example 14

An average technical grade of light colored firm petrolatum (average M. W. about 500) was used to produce a sodium sulfonate salt (molecular weight about 602). Petrolatum is a hydrocarbon mixture of paraffin, branched and ring compounds containing wax and oil. Petrolatum wax is stated to have a molecular weight range of 474 to 603 (pages 274–8, The Chemistry and Technology of Waxes, A. H. Warth (1947)).

The reaction was carried out as follows: 352 gms. of petrolatum (M. W. above 474) were placed in a flask fitted with an efficient stirrer, a fine-pore gas distributing inlet tube, thermometer, condenser and exit tube, an outside cooling water bath, an actinic light supplied by two 100 watt tungsten bulbs. The petrolatum was melted and brought to a temperature of 60° C. and the reaction started by passing a mixture of sulfur dioxide and chlorine at as a high a rate as possible and in as finely divided state as possible, through the melted petrolatum. The rate of sulfur dioxide flow was regulated to be 2 to 3 times the amount of chlorine. The temperature was maintained at between 55 to 62° C. The reaction was continued for one hour and a half and then stopped, purged with carbon dioxide and then weighed. It was found that there was a gain in weight of 32.7 gms. This corresponds to a conversion of about 46%. This material was then treated with hot strong sodium hydroxide solution to cause hydrolysis and conversion of the sulfonyl chloride to the sodium sulfonate. This material was purified by repeated washing in water and sodium chloride solutions until the pH was near neutral. The material was then dried and ready for use in dynamic stuffing formulations.

In order to minimize di-sulfonation, the reaction is carried out so that only partial conversion is made, preferably under 50% or less. Low temperature, efficient agitation, high rate of sulfur dioxide in proportion to chlorine also favor monosulfonation, which is desired. Dynamic stuffing compositions were made up from this material as follows:

(a)

| | Percent |
|---|---|
| Sulfonate product (mixture: 23% high molecular weight sulfonate, 27% petrolatum) | 50 |
| Oleic acid | 50 |
| | 100 |

(b)

| | |
|---|---|
| Sulfonate product (mixture: 6% high molecular weight sulfonate, 7% petrolatum) | 13 |
| Petrolatum | 43 |
| Oleic acid | 44 |
| | 100 |

These materials were incorporated by usual methods into pieces of retan leather to the extent of 20 to 22% and then tested on the fast dynamic testing machine. Some pieces ran 2 hours without penetration of water. By the ALCA dynamic test machine, this leather would probably run 5 or more hours without penetration. Equivalent leather with usual tannery stuffing materials tested only 1 to 3 minutes.

*Example 15*

Microcrystalline amber wax of 155° F. melting point, and of estimated average molecular weight of 560, was sulfochlorinated by the Reed reaction in a similar manner to Example 14. In this case, 303 gms. were used. The temperature was maintained at 70-79° C. range to keep the wax melted, and the reaction run for 1 hour and 10 minutes. There was a gain of 16 gms. and the percentage of reaction calculated to be approximately 30%. The material was converted to the sodium sulfonate by pouring hot into strong caustic soda solution. It was then thoroughly washed as before, separated and dried. The molecular weight of the sodium sulfonate was estimated to be 662, corresponding to an empirical formula of approximately $C_{41}H_{67}SO_3Na$.

The following compositions were used:

| | Percent |
|---|---|
| Sulfonation product (mixture: 15% high molecular weight hydrocarbon sulfonate (M. W. approximately 662)) | 50 |
| Oleic acid | 50 |
| | 100 |

| | |
|---|---|
| Sulfonation product (mixture: 6% high molecular weight hydrocarbon sulfonate (M. W. about 662; 14% microcrystalline wax)) | 20 |
| Petrolatum | 40 |
| Oleic acid | 40 |
| | 100 |

Leather pieces were treated in the usual ways with these compositions to make 20-22% in the leather. Dynamic tests on the "fast machine" ran up to 2 hours without penetration on many pieces. By the ALCA dynamic method many pieces would probably run up to 5 hours.

*Example 16*

The synthesis method of Example 15 was used on a paraffin wax (alkane) of molecular weight about 450. The molecular weight of the sulfonate thus obtained is 552, corresponding to an empirical formula of $C_{32}H_{65}SO_3Na$.

While this sulfonate is too hard to be used by itself in a leather treating composition, it can be softened by admixture with softer petroleum sulfonates having a non alkane hydrocarbon radical of about 27 carbon atoms or higher.

*Example 17*

A polysulfonated very high molecular weight hydrocarbon sulfonate was obtained by the direct sulfonation with concentrated sulfuric acid of a synthesized high molecular weight alkyl aryl hydrocarbon with a molecular weight of approximately 2000 and estimated to be composed of about 5 paraffin chains of about 22 carbon atoms each and 2 to 4 naphthalene rings. The formation of such a hydrocarbon is accomplished by chlorinating a paraffin wax of melting point about 50° C. until it contains about 14% chlorine and then condensing this product with naphthalene, using about 15% by weight, plus 7-9% anhydrous aluminum chloride at a temperature of 25-35° C. Purification is carried out by distillation and by solvent extraction. A product of this kind was obtained in mineral oil solution. Direct sulfonation with sulfuric acid can be accomplished on such a hydrocarbon by using methods commonly employed in producing synthetic detergents. The preparation of a suitable sulfonate was carried out as follows: 25 parts of alkyl aryl hydrocarbon, of about M. W. 2000, with approximately 75 parts of mineral oil, and 70 parts of light petrolatum naphtha were placed in a flask equipped with mechanical stirrer. 157 parts 66° Bé sulfuric acid by weight was then added over a period of 20 minutes, while stirring. The temperature rose from 23° C. to 29° C. and then heat was applied to bring the mass to a temperature of 60° C. where it was held for 1½ hours. After cooling, this reaction mixture was placed in 600 ml. water in a separatory funnel, shaken thoroughly and then the lower acid water layer separated off. Washing was continued several times this way and using 100 ml. of isopropanol and some salt (sodium chloride) as needed to help prevent emulsion formation. The material was then neutralized with a strong sodium hydroxide solution to form the sodium salt. The neutralization was aided by warming the mixture and by the use of added solvent such as toluene, xylene, VMP naphtha or Stoddard solvent to aid in dispersing the mass. After neutralization, the material was again washed with water containing some salt (sodium chloride) until nearly neutral and was then separated and dried, free of moisture and any added solvent. This material is a multiple sulfonated molecule, containing at least two sulfonate groups. Due to the size of the molecule, the ratio of the sulfonate groups to the hydrocarbon portion is low, i. e., less than one sulfonate group per each 27 carbon atoms in the molecule; the ratio of the radical weight of the sulfonate groups in this type of polysulfonate product is about 20% or less of the total molecular weight of the sulfonate. The sulfonation can be varied to produce higher or lower degrees of sulfonation. By varying the size of the hydrocarbon molecule, almost any ratio of sulfonation and size of molecule can be obtained. In any case, the percent of —$SO_3$— in the molecule of a polysulfonate must not be more than would be present in a mono-sulfonated hydrocarbon of a molecular weight of about 500, and preferably should be less.

The product obtained from this sulfonation was made into the following stuffing composition and incorporated into the leather to the extent of 20-22%:

| | Percent |
|---|---|
| Sulfonation product (mixture: 7% very high molecular weight hydrocarbon sulfonate, M. W. about 2000; 23% mineral oil) | 30 |
| Petrolatum | 35 |
| Oleic acid | 35 |
| | 100 |

Dynamic test results were good, about the same as obtained with the other synthesized materials set forth in Examples 14 to 16.

The special machine on which the dynamic water resistance tests set forth in the foregoing examples were carried out on a specially constructed machine, which takes test pieces of leather of size 2⅞" x 2⅞" or smaller, cups the leather so that it will hold water and compresses the piece together to give folds similar to those in a shoe, and at a rate of 60 cycles per minute, which is close to the normal rate of walking. The machine can be regulated for compression pressure, and in all of the tests made for the data given here a pressure of 8 lbs. was used. The machine was compensated to allow for variations in the thickness, flexibility, etc. of the leather, thus providing more uniformity in the test. This is a more severe test than is obtained by machines such as the ALCA (American Leather Chemists Association) leather testing machine, also known as the "Maeser machine". Comparison tests between my "fast dynamic testing machine" and the ALCA machine indicate that water penetration as measured on the "fast machine" takes place in about half the time as compared with the ALCA machine.

While, as heretofore stated, I prefer the use of high molecular weight hydrocarbon monosulfonates having at least about 27 carbon atoms in the molecule, preferably those of molecular weight 500 or higher, I can, as shown in the last example use polysulfonated products, provided the hydrophobic hydrocarbon radical is sufficiently large to have a radical weight of at least about 80% of the molecular weight of the compound, which reduces the ratio of the radical weight of the hydrophylic sulfonate (—$SO_3Na$) groups to about 20% or less of the molecular weight of the polysulfonate; this relationship can also be stated in terms of the ratio of number of sulfonate groups to the number of carbon atoms in the hydrocarbon radical, namely not more than about 1:27.

EMPLOYMENT OF HIGHER FATTY ALCOHOLS

Finally, I have found that in lieu of or in addition to the fatty acids which are incorporated together with high molecular weight hydrocarbon sulfonates in leather stuffing compositions in accordance with the present invention, I may substitute fatty alcohols, i. e., long chain alcohols of the type formula $R'OH$, wherein $R'$ is a hydrocarbon radical of at least 10 carbon atoms, analogous to the hydrocarbon radical R of high fatty acids of the type formula $R.COOH$. Examples of such alcohols are lauryl alcohol, myristyl alcohol, cetyl alcohol, oleyl alcohol, stearyl alcohol, and high molecular weight mixed fatty alcohols synthesized from tallow. The synergistic coaction in leather stuffing between high molecular weight hydrocarbon sulfonate and fatty alcohol is analogous to the synergistic coaction between high molecular weight petroleum sulfonate and fatty acids (see Examples 6-11), as is shown by the following specific example:

*Example 18*

A leather treating composition containing:

| | Percent |
|---|---|
| Petroleum sulfonate product (mixture: 9.5% hydrocarbon sulfonate having a molecular weight above 500; 10.5% mineral oil) | 20 |
| Mixed soft fatty alcohols synthesized from tallow | 20 |
| Petrolatum | 60 |
| | 100 | was applied to leather so as to constitute 20–24% of the weight of the stuffed leather. The leather thus treated has good feel, fullness, flexibility and good ventilation properties, and showed water resistance of about 2 hours, when tested on the fast dynamic testing machine.

However, for reasons of generally lower cost and higher effectiveness of higher fatty acids, as compared with higher fatty alcohols, I presently prefer the former to the latter in my leather treating compositions.

Leather treating compositions embodying the principles of my invention can be applied to leather in any manner customary in the art, e. g., by hot swabbing, fat liquoring, drum stuffing, solvent solution dip, etc. After completion of the stuffing etc. treatment, the treated leather can withstand heat, cold, moisture, etc., without deteriorating the treating composition absorbed by the leather, and is free from any irritating or toxic effect to the wearer of shoes or other articles of clothing made from such leather.

Having thus described the principle of my invention and a number of specific examples which demonstrate the practice of my invention by way of illustration rather than by way of limitation, it will be understood that changes and modifications in proportions and materials, all falling within the spirit of my invention will become readily apparent to the expert. I thus intend to claim my invention broadly, and define its scope by the appended claims.

I claim:

1. Process of rendering leather water-resistant, comprising impregnating said leather with a leather-stuffing composition including at least one member of the group consisting of fat, oil, wax and petrolatum, and containing as an activating ingredient, in an amount from about 4 percent to about 75 percent by weight of said composition, a high-molecular-weight organic compound characterized by a hydrocarbon radical having at least about 27 carbon atoms, said high-molecular-weight organic compound being a member of the group consisting of (1) sterols having at least about 27 carbon atoms in the molecule, and (2) a water-insoluble sulfonate of a molecular weight of at least about 470 and having the general formula

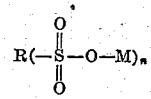

wherein R is a hydrocarbon radical having at least about 27 carbon atoms, M is a member of the group consisting of monovalent metal and amino, and n is at least 1, the ratio of the numerical value of n to the number of carbon atoms in R being not more than about 1:27.

2. Process of rendering leather water-resistant, comprising impregnating said leather with a leather-stuffing composition including at least one member of the group consisting of fat, oil, wax and petrolatum, and containing as an activating ingredient, in an amount from about 4 percent to about 75 percent by weight of said composition, a sterol having at least about 27 carbon atoms in the molecule.

3. Process according to claim 2, wherein said sterol is a monohydric alcohol obtained by the de-esterification of wool fat.

4. Process according to claim 2, wherein said sterol is a member of the group consisting of cholesterol, dihydrocholesterol, and isocholesterol.

5. Process according to claim 2, wherein said sterol is sitosterol.

6. Process of rendering leather water-resistant, comprising impregnating said leather with a leather-stuffing composition including at least one member of the group consisting of fat, oil, wax and petrolatum, and containing as active ingredients, in an amount from about 4 percent to about 75 percent by weight of said composition, a mixture of a higher fatty acid and of a monohydric solid alcohol, said acid and alcohol being de-esterification products of wool fat.

7. Process of rendering leather water-resistant, comprising impregnating said leather with a leather-stuffing composition including at least one member of the group consisting of fat, oil, wax and petrolatum, and containing as an activating ingredient, in an amount from about 4 percent to about 75 percent by weight of said composition, a water-insoluble sulfonate of a molecular weight of at least about 470 and having the general formula

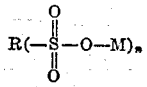

wherein R is a hydrocarbon radical having at least about 27 carbon atoms in the molecule, M is a member of the group consisting of monovalent metal and amino, and $n$ is at least 1, the ratio of the numerical value of $n$ to the number of carbon atoms in R being not more than about 1:27.

8. Process according to claim 7, wherein M is sodium.

9. Process according to claim 7, wherein $n$ is 1.

10. Process of rendering leather water-resistant, comprising impregnating said leather with a leather-stuffing composition including at least one member of the group consisting of fat, oil, wax and petrolatum, and containing a higher fatty acid and as an activating ingredient, in an amount from about 4 percent to about 75 percent by weight of said composition, therefor a water-insoluble sulfonate of a molecular weight of at least about 470 and having the general formula

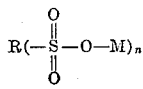

wherein R is a hydrocarbon radical having at least about 27 carbon atoms, M is a member of the group consisting of monovalent metal and amino, and $n$ is at least 1, the ratio of the numerical value of $n$ to the number of carbon atoms in R being not more than about 1:27.

11. Process of rendering leather water-resistant, comprising impregnating said leather with a leather-stuffing composition including at least one member of the group consisting of fat, oil, wax and petrolatum, and containing as an activating ingredient, in an amount from about 4 percent to about 75 percent by weight of said composition, a water-insoluble sulfonate of a molecular weight of at least about 500 and having the general formula

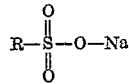

R being a monovalent hydrocarbon radical having at least about 27 carbon atoms.

12. Process of rendering leather water-resistant, comprising impregnating said leather with a leather-stuffing composition including at least one member of the group consisting of fat, oil, wax and petrolatum, and containing a higher fatty acid and as an activating ingredient, in an amount from about 4 percent to about 75 percent by weight of said composition, therefor a water-insoluble sulfonate of a molecular weight of at least about 500 and having the general formula

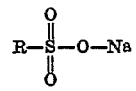

R being a monovalent hydrocarbon radical having at least about 27 carbon atoms.

13. A composition for imparting water-resistance to leather, comprising a leather-stuffing material including at least one member of the group consisting of fat, oil, wax and petrolatum, and containing a member of the group consisting of higher fatty acids and higher fatty alcohols, and as an activator therefor a high-molecular-weight organic compound characterized by a hydrocarbon radical having at least about 27 carbon atoms, said high-molecular-weight organic compound being a member of the group consisting of (1) a sterol having at least about 27 carbon atoms in the molecule and (2) a water-insoluble sulfonate of a molecular weight of at least about 470 and having the general formula

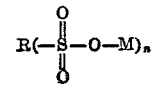

wherein R is a hydrocarbon radical, M is a member of the group consisting of monovalent metal and amino, having at least about 27 carbon atoms, and $n$ is at least 1, the ratio of the numerical value of $n$ to the number of carbon atoms in R being not more than about 1:27; said activator being present in an amount from about 4 percent to about 75 percent by weight of said composition.

14. A composition for imparting water-resistance to leather, comprising a leather-stuffing material including at least one member of the group consisting of fat, oil, wax and petrolatum, and containing a higher fatty acid and as an activator therefor a sterol having at least about 27 carbon atoms in the molecule; said activator being present in an amount from about 4 percent to about 75 percent by weight of said composition.

15. A composition for imparting water-resistance to leather, comprising a leather-stuffing material including at least one member of the group consisting of fat, oil, wax and petrolatum, and containing a mixture of de-esterification products of wool-fat, said de-esterification products including a higher fatty acid and a monohydric solid alcohol having at least about 27 carbon atoms in the molecule; said activator being present in an amount from about 4 percent to about 75 percent by weight of said composition.

16. A composition for imparting water-resistance to leather, comprising a leather-stuffing material including at least one member of the group consisting of fat, oil, wax and petrolatum, a member of the group consisting of higher fatty acids and higher fatty alcohols, and as an activator therefor a water-soluble sulfonate of a molecular weight of at least about 470 and having the formula

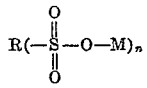

wherein R is a hydrocarbon radical having at least about 27 carbon atoms, M is a member of the group consisting of monovalent metal and amino, and $n$ is at least 1, the ratio of the numerical value of $n$ to the number of carbon atoms in R being at least about 1:27; said activator being present in an amount from about 4 percent to about 75 percent by weight of said composition.

17. A composition for imparting water-resistance to leather, comprising a leather-stuffing material including at least one member of the group consisting of fat, oil, wax and petrolatum, and containing a higher fatty acid and as an activator therefor a water-insoluble sulfonate of a molecular weight of at least about 500 and having the general formula

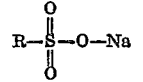

R being a hydrocarbon radical having at least about 27 carbon atoms; said activator being present in an amount from about 4 percent to about 75 percent by weight of said composition.

18. Water-resistant leather treated according to claim 1.

References Cited in the file of this patent

UNITED STATES PATENTS

| | | |
|---|---|---|
| 2,032,250 | Bower | Feb. 25, 1936 |
| 2,093,431 | Frolich | Sept. 21, 1937 |
| 2,132,348 | Bertsch | Oct. 4, 1938 |

OTHER REFERENCES

Condensed Chemical Dictionary, 4th ed., Reinhold Pub. Corp., N. Y., 1950, page 170.